United States Patent [19]

Baba

[11] Patent Number: 4,580,394
[45] Date of Patent: Apr. 8, 1986

[54] CENTRIFUGAL COUNTERBALANCE ELEMENT FOR A FILAMENT CUTTER

[75] Inventor: Toru Baba, Yokosuka, Japan
[73] Assignee: Kioritz Corporation, Tokyo, Japan
[21] Appl. No.: 701,240
[22] Filed: Feb. 13, 1985

[30] Foreign Application Priority Data

Feb. 14, 1984 [JP] Japan .............................. 59-19584[U]

[51] Int. Cl.[4] ............................................. A01D 34/63
[52] U.S. Cl. .......................................... 56/12.7; 30/276
[58] Field of Search ...................... 56/12.7; 30/276, 347

[56] References Cited

U.S. PATENT DOCUMENTS

| | | | |
|---|---|---|---|
| 4,177,561 | 12/1979 | Ballas et al. | 56/12.7 |
| 4,189,833 | 2/1980 | Kwater | 56/12.7 |
| 4,203,212 | 5/1980 | Proulx | 30/276 |
| 4,209,902 | 7/1980 | Moore et al. | 56/12.7 |
| 4,236,309 | 12/1980 | Cayou | 56/12.7 |
| 4,281,505 | 8/1981 | Fuelling, Jr. | 56/12.7 |
| 4,476,632 | 10/1984 | Proulx | 30/276 |

*Primary Examiner*—Paul J. Hirsch

[57] ABSTRACT

A cutter blade device of a mowing machine including a casing, a spool formed with three flanges to define two groove sections oriented in the axis of rotation of the casing each for winding a cord thereon, and an annular projection formed in the casing and interposed between the spool and an inertia shifter to extend toward an intermediate flange of the spool. A free end portion of the cord wound on a lower groove section of the spool is passed over the top of the annular projection and through one of two openings formed in the inertia shifter, so that a force exerted by centrifugal forces to the free end portion of the cord and tending to move the inertia shifter in the direction of the axis of rotation of the casing and brought same out of engagement with the casing is cancelled by the annular projection.

2 Claims, 1 Drawing Figure

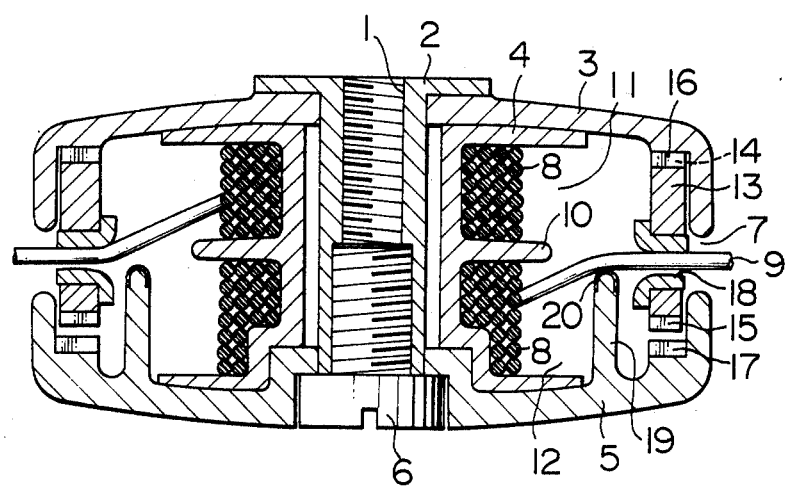

CENTRIFUGAL COUNTERBALANCE ELEMENT FOR A FILAMENT CUTTER

BACKGROUND OF THE INVENTION

This invention relates to a cutter blade device of a mowing machine including a flexible cord, such as a nylon cord, wound and held in the machine to serve as a cutter for cutting grass.

Generally, the cutter blade device of the mowing machine of the type described is mounted to a lower end of a drive shaft extending through an operating rod of the mowing machine and driven for rotation by a relatively small internal combustion engine located rearwardly of the operating rod. In one type of cutter blade device known in the art, a spool having cords wound thereon is fitted in a casing, and an inertia shifter which is rotatable and movable in the direction of the axis of rotation of the casing and the spool is disposed along an inner periphery of the casing, and outer end portions of the cords are drawn out from the casing through openings formed in the inertia shifter to perform a mowing operation. When the outer end portions of the cords have been worn out after use, the machine is rapidly caused to swing to rotate the inertia shifter through a predetermined angle to thereby enable the cords to be further payed out from the casing automatically. In a construction in which the inertia shifter is kept in engagement with the casing by utilizing the behavior of the cords to become straight under the influence of centrifugal forces during operation, the positions in which the cords are payed out of the spool and positions in which the openings are formed in the inertia shifter preferably remain unchanged relative to each other. Misoperation of the inertia shifter would tend to occur when a large spool is used to wind a plurality of cords for improving operation efficiency.

SUMMARY OF THE INVENTION

This invention has been developed for the purpose of obviating the aforesaid problem of the prior art. Accordingly, the invention has as its object the provision of a cutter blade device of a mowing machine which is simple in construction and capable of readily and smoothly paying out the cords by eliminating the risk that the inertia shifter might misoperate.

The outstanding characteristics of the invention enabling the aforesaid object to be accomplished are as follows: in a cutter blade device of a mowing machine comprising a casing mounted to a drive shaft for rotation, a spool secured in the casing, flexible cords wound on the spool and having free end portions drawn out from the casing to outside, and an inertia shifter formed with openings for the cords to extend therethrough and movable in the direction of the axis of rotation of the casing and rotatable peripherally of the casing while being brought into and out of engagement with the casing at front sides to the direction of rotation of the casing, the spool is formed with an upper flange, a lower flange and an intermediate flange to define two groove sections oriented in the direction of the axis of rotation to wind each cord on one of the two groove sections; and the casing is formed with an annular projection interposed between the spool and the inertia shifter and extending upwardly along the axis of rotation toward the intermediate flange, wherein the free end portion of the cord wound on each groove section of the spool extends over the top of the annular projection before being inserted in the opening formed in the inertia shifter, and a force exerted by centrifugal forces to the free end portion of the cord tending to move the inertia shifter in the direction of the axis of rotation and bring same out of engagement with the casing is cancelled by the annular projection.

By virtue of the aforesaid constituent features of the invention, the free end portions of the cords extending from the spool to the openings formed in the inertia shifter are supported by the annular projection and an unnecessary force produced by centrifugal forces in the free end portions of the cords which tends to move the inertia shifter is cancelled by the annular projection. Thus, in the cutter blade device of a mowing machine according to the invention, the risk that the inertia shifter might inadvertently be actuated during operation to unnecessarily draw out the cords from the spool is eliminated, and the cords can be drawn out smoothly and readily from the casing to outside whenever it is necessary to do so.

BRIEF DESCRIPTION OF THE DRAWING

The single drawing is a schematic vertical sectional view of the cutter blade device of a mowing machine comprising one embodiment of the invention.

DESCRIPTION OF THE PREFERRED EMBODIMENTS

A preferred embodiment of the invention will now be described by referring to the accompanying drawing.

A threaded opening 1 is formed in a boss 2 for threadably receiving a lower end portion of a drive shaft, not shown, of the mowing machine, and an upper casing member 3 of a bowl shape having its open end facing downwardly, a spool 4 of a construction presently to be described, and a lower casing member 5 of a bowl shape having its open end facing upwardly are fitted to the boss 2 from below in the indicated order and a screw 6 is threadably connected to the boss from below to hold them in place. When the upper and lower casing members 3 and 5 are assembled, an annular gap 7 is defined therebetween through the entire circumference to enable free end portions 9 of a plurality of cords 8 presently to be described to be drawn out from the casing members 3 and 5 without any trouble.

The spool 4 includes an intermediate flange 10 and upper and lower flanges to define an upper groove section 11 between the intermediate flange 10 and the upper flange, and a lower groove section 12 between the intermediate flange 10 and the lower flange. Each cord 8 is wound on one of the groove sections 11 and 12 in a direction which is opposite the direction of rotation of the casing.

An inertia shifter 13 of annular configuration is interposed between inner peripheral surfaces of the casing members 3 and 5 and an outer peripheral surface of the spool 4 for vertical sliding movement and rotary movement in a circumferential direction along the inner peripheral surface of the casing with respect to the axis of the boss 2. Engaging projections 14 and 15 are located on top and bottom surfaces of a peripheral edge of the inertia shifter 13 in positions vertically spaced apart equidistantly from each other, and locking projections 16 and 17 corresponding to the engaging projections 14 and 15 respectively are located on the upper casing member 3 and lower casing member 5 respectively. The locking projections 16 and 17 are arranged such that there is a phase difference in a circumferential direction between them so that substantially one-half the amount of cords desired to be payed out of the spool 4 can be payed out each time the inertia shifter 13 moves downwardly and upwardly. Two openings 18 are formed in diametrically opposed positions substantially in the center of a portion of the inertia shifter 13 having the engaging projections 14 and 15 mounted therein which is exposed to the annular gap 7. Each of the free end portions 9 of the cords 8 payed out of the upper groove section 11 and lower groove section 12 of the spool 4 is inserted in one of the openings 18 before being drawn out from the casing and then passed through the annular gap 7 to outside.

The lower casing member 5 has formed integrally therewith an annular projection 19 which is interposed between the spool 4 and the inertia shifter 13 and extends upwardly from an inner surface of the lower casing member 5 toward the intermediate flange 10. The annular projection 19 has an upper end which is disposed substantially at the same elevation as the openings 18 formed in the inertia shifter 13 when the latter is disposed in an uppermost position or in a position in which, as shown, the upper engaging projection 14 of the inertia shifter 13 is in engagement with the locking projection 16 of the upper casing member 3 and the lower engaging projection 15 of the inertia shifter 13 is out of engagement with the locking projection 16 of the lower casing member 5 and displaced upwardly therefrom. Thus, the cord 8 payed out of the lower groove section 12 of the spool 4 is supported by the upper end of the annular projection 19 as it extends toward the inertia shifter 13, and as the free end portion 9 of the cord 8 stretches radially of the casing by virtue of centrifugal forces during operation, a downwardly oriented force exerted to the inertia shifter 13 by the free end portion 9 is cancelled by the annular projection 19 and kept from being applied to the inertia shifter 13. Accordingly, the inertia shifter 13 is kept in engagement with the casing while being disposed in the illustrated uppermost position, thereby eliminating the risk that the cord might be inadvertently be payed out of the spool 4 and drawn out from the casing through the opening 18.

When it is desired to pay out the cord 8 from the casing when the free end portion 9 sticking out of the casing through the opening 18 has been worn out, the machine is caused to swing vertically while the casing remains rotating. This results in the inertia shifter 13 moving downwardly relative to the casing by its own inertia to a lowermost position in which the upper engaging projection 14 is disposed below the locking projection 16 after being released from engagement therewith and the lower engaging projection 15 is in engagement with the locking projection 17. During its downward movement, the inertia shifter 13 is rotated by centrifugal forces exerted on the free end portion 9 of the cord 8 so that one-half the predetermined amount of cord 8 to be payed out of the spool 4 is payed out. The free end portion 9 is still pulled outwardly thereafter, so that the cord 8 tends to become straight and push the inertia shifter 13 to an uppermost position. During its upward movement, the inertia shifter 13 causes the rest of the cord or another one-half of the predetermined amount of cord 8 to be payed out while the inertia shifter 13 is maintained in the uppermost position.

In the illustrated embodiment, an annular cover member 20 formed of a material which offers least friction to the cords 8 and which is highly resistant to wear, such as aluminum, is applied to the upper end portion of the annular projection 19. This is preferred to prolong service life of the device and the cords.

Another embodiment of the invention will now be described, although it is not shown. In this embodiment, the annular projection 19 formed in the lower casing member 5 is not provided and the upper casing member 3 is formed integrally with an annular projection extending downwardly from an inner surface thereof and having a lower end located in a position in which it is disposed in the same horizontal plane as the lowermost position of the inertia shifter for supporting the free end portion of the cord payed out of the upper groove section of the spool. Thus, an upwardly oriented force exerted by the free end portion of the cord during operation is cancelled by the annular projection and kept from acting on the inertia shifter, to thereby maintain the latter in the lowermost position during operation. Other parts are similar to those of the embodiment shown in the drawing. Thus, when the free end portion of the cord is worn out during operation, the cord can be further payed out of the spool by moving the inertia shifter between its uppermost and lowermost positions in the same manner as described by referring to the embodiment shown in the drawing.

What is claimed is:

1. A cutter blade device of a mowing machine comprising:
    a casing mounted to a drive shaft for rotation;
    a spool secured in said casing;
    flexible cords wound on said spool and having free end portions drawn out from the casing to outside; and
    an inertia shifter formed with openings for the cords to extend therethrough and movable in the direction of the axis of rotation of the casing and rotatable peripherally of the casing while being brought into and out of engagement with the casing at the periphery; wherein the improvement resides in that:
    said spool is formed with an upper flange, a lower flange and an intermediate flange to define two groove sections oriented in the direction of the axis of rotation of the casing to wind each said cord on one of said two groove sections; and
    the casing is formed with an annular projection interposed between the spool and the inertia shifter and extending upwardly along the axis of rotation toward the intermediate flange;
    wherein the free end portions of the cords wound on the groove sections of the spool extend over the top of the annular projection before being inserted in the openings formed in the inertia shifter, and a force exerted by centrifugal forces to the free end portions of the cords tending to move the inertia shifter in the direction of the axis of rotation and bring same out of engagement with the casing is cancelled by the annular projection.

2. A cutter blade device of a mowing machine as claimed in claim 1, wherein an upper end portion of said annular projection is covered with a cover member formed of a material which offers least friction to the cords and which is highly resistant to wear.

* * * * *